No. 748,389. PATENTED DEC. 29, 1903.
J. W. MacDONALD.
DEVICE FOR FREEZING MILK OR OTHER LIQUIDS.
APPLICATION FILED AUG. 10, 1903.
NO MODEL.

Witnesses
Inventor

No. 748,389. Patented December 29, 1903.

UNITED STATES PATENT OFFICE.

JOHN W. MacDONALD, OF PITTSBURG, PENNSYLVANIA.

DEVICE FOR FREEZING MILK OR OTHER LIQUIDS.

SPECIFICATION forming part of Letters Patent No. 748,389, dated December 29, 1903.

Application filed August 10, 1903. Serial No. 168,891. (No model.)

*To all whom it may concern:*

Be it known that I, JOHN W. MACDONALD, of the city of Pittsburg, Pennsylvania, have invented a certain new and useful Improvement in Devices for Freezing Milk or other Liquids, the object of which improvement is to provide a machine of this class which will be easy of operation and produce an evenly-frozen ice, of which the following, taken in connection with the accompanying drawings, is a description.

Figure 1:
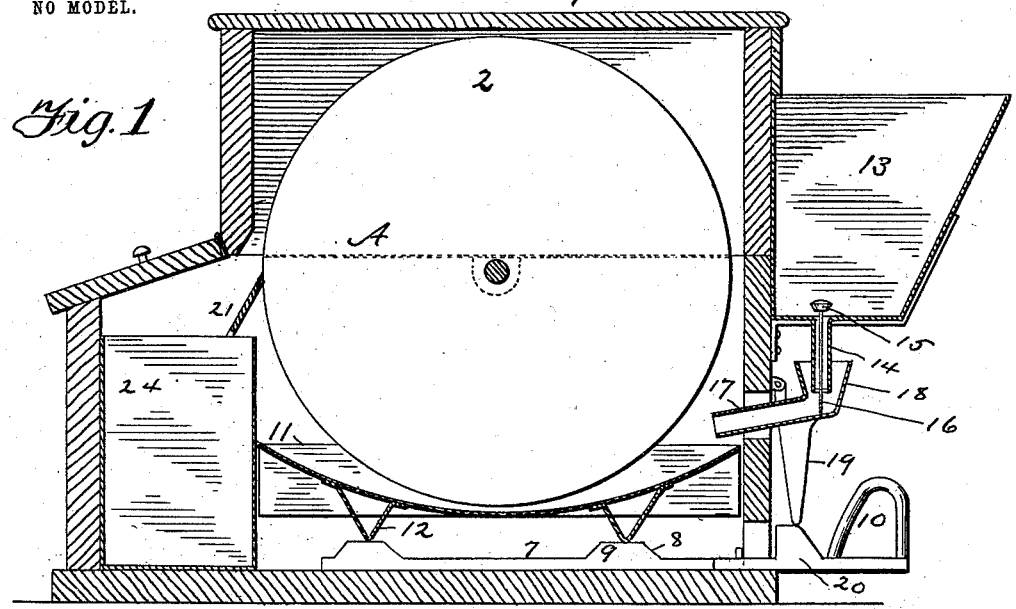
Figure 2:
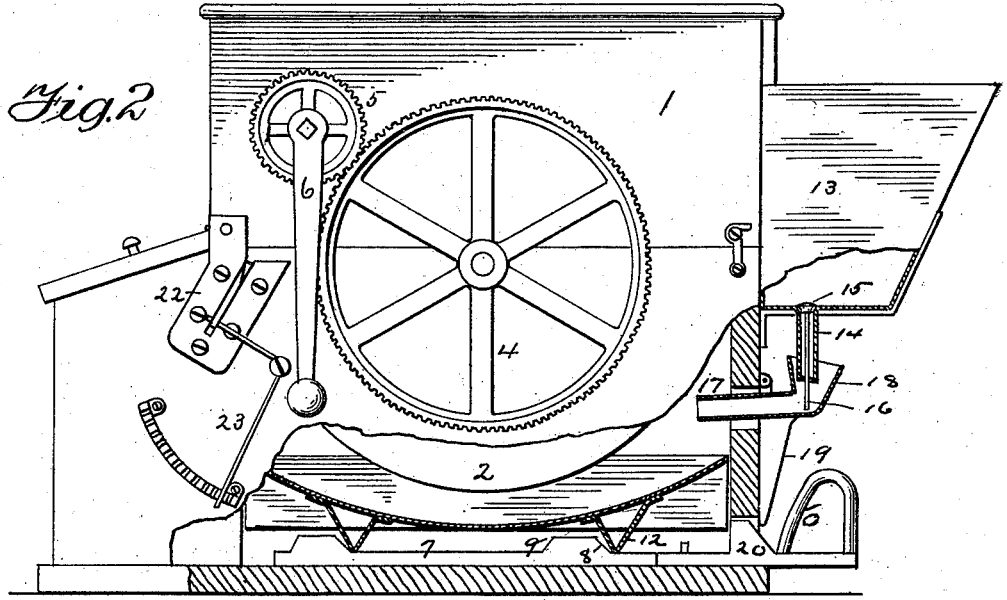
Figure 3:
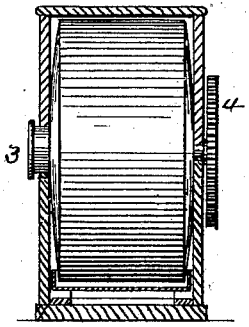

Figure 1 is a vertical sectional view of such a machine when in operation. Fig. 2 is a view, partly in elevation and partly in section, when at rest. Fig. 3 is a transverse sectional view through dotted line A of Fig. 1, but on a smaller scale.

To construct such a device, a casing 1, of wood or similar material, is formed in two parts divided on line A. From suitable sheet metal a cylindrical reservoir 2 is formed, having trunnions 3, one of which is made hollow to admit ice to the reservoir 2, the other being solid and having fitted thereto a cogged wheel 4, which engages with a smaller wheel 5, carrying a crank 6, journaled to the outside of the case 1. Said reservoir 2 is placed inside case 1 and is supported by the sides thereof, which are cut away to admit the trunnions 3. Upon the bottom of case 1 is fitted a sliding framework 7, having inclines 8 and resting-planes 9 and an extension part passing through one end of the case 1, to which is attached a handle 10. A pan 11 of a size to be readily moved up and down within the case 1 is formed from sheet metal and provided upon its under side with lugs 12. Resting upon suitable brackets at one end of case 1 and at a proper elevation above the pan 11 is a removable reservoir 13, provided with an opening in the bottom thereof, in which is fitted a downwardly-projecting tube 14. Inside said reservoir and acting to close the opening in the bottom thereof is fitted a valve 15, provided with a depending stem 16. Underneath said reservoir 13 and hinged to and projecting through the end of casing 1 and above the pan 11 is a movable spout 17, provided with an enlarged part 18, which receives the tube 14 and also acts to support the depending stem 16 of the valve 15. The spout 17 is provided with a downwardly-projecting part 19, which impinges upon the lug 20, formed upon the extension part of the frame 7. At the opposite end of the case 1 is fitted an adjustable scraper 21, held in such position by fittings 22, attached to the sides of said case, as that one edge thereof will bear upon the cylinder 2 and be held thereto by the springs 23. Underneath the scraper 21 and inside case 1 is provided a storage-box 24 to receive the ice from the cylinder 2.

To put said improvement into operation, cylinder 2 is filled with freezing material and caused to be revolved. At the same time the handle 10 is pulled to position shown in Fig. 1, which raises the pan 11 and the spout 17, as well as opens the valve 15. The material to be frozen may now be placed in reservoir 13, from which it will flow by way of the tube 14 and spout 17 to the movable pan 11, whence it is taken up by the revolving freezing-cylinder and from which it is in turn taken by the scraper 21 and deposited in the storage-bin 24.

If for any reason the motion of the freezing-cylinder be interrupted, the flow of liquid may be stopped and the liquid then in the feed-pan 11 dropped away from and out of contact with the freezing-cylinder by pushing the handle 10 to the position shown in Fig. 2, where, it will be seen, the resting-planes 9 have passed from under the lugs of the feed-pan 11, permitting said pan to drop down, and the same movement dropping down the spout 17 has closed the valve 15 and shut off the flow of liquid to the feed-pan.

To resume operations, the handle 10 only need be returned to the position shown in Fig. 1 and the freezing-cylinder again put in motion.

What I claim, and desire to secure by Letters Patent, is—

In a device for freezing liquids, the combination with a revolving freezing-cylinder, a feed-pan therefor, a frame placed beneath said pan for supporting the same adapted to move horizontally on a line parallel with the length of said feed-pan carrying inclines so arranged thereon with reference to their line of inclination that the pan will be raised and lowered according as said frame is moved backward and forward, and a reservoir for supplying said feed-pan, of a feed-valve in the bottom of said reservoir, provided with a depending stem, and a movable supply-spout adapted to receive the lower end of said valve-stem, and provided with a downwardly-projecting part impinging upon said frame; the said spout and feed-valve being adapted to be operated by the same movement of the said frame that raises and lowers the feed-pan, as shown and described and for the purpose set forth.

J. W. MacDONALD.

Witnesses:
H. J. DUNCAN,
L. H. KRANZ.